United States Patent [19]
Laurenson, Jr.

[11] Patent Number: 5,092,407
[45] Date of Patent: * Mar. 3, 1992

[54] COMPOST OR AMENDMENT FIRE CONTROL SYSTEM WITH IMPROVED FLOW CONTROL

[75] Inventor: John G. Laurenson, Jr., 3223 Harbor Dr. Camache Island Villas, St. Augustine, Fla. 32084

[73] Assignee: John G. Laurenson, Jr., Jacksonville, Fla.

[*] Notice: The portion of the term of this patent subsequent to Jun. 6, 2006 has been disclaimed.

[21] Appl. No.: 190,339

[22] Filed: May 5, 1988

Related U.S. Application Data

[63] Continuation-in-part of Ser. No. 643,080, Aug. 22, 1984, Pat. No. 4,837,153.

[51] Int. Cl.$^5$ ............................................. A62C 31/05
[52] U.S. Cl. ................................... 169/68; 169/5; 169/45
[58] Field of Search ................... 169/43, 46, 54, 66, 169/5, 45, 68, 70; 71/9

[56] References Cited

U.S. PATENT DOCUMENTS

| | | | |
|---|---|---|---|
| 1,434,879 | 11/1922 | Dodds | 169/54 |
| 2,006,258 | 6/1935 | Betzler | 169/70 |
| 4,245,478 | 1/1981 | Covy | 169/66 |
| 4,270,612 | 6/1981 | Larsson | 169/45 |
| 4,410,349 | 10/1983 | Laurenson, Jr. | 71/9 |

Primary Examiner—Joseph F. Peters, Jr.
Assistant Examiner—Virna Lissi Mojica
Attorney, Agent, or Firm—Foley & Lardner

[57] ABSTRACT

The present invention provides a method and apparatus for controlling combustion in a compost or amendment mass. The fire control fluid flow control is provided by a lance having at least two separate fluid flow zones to provide a fluid flow profile in the compost or amendment mass. The flow zones are provided by an outer porous wall tube with a control insert tube therein having a plurality of openings along the length thereof and spaced from the wall by gaskets to form the flow zones. The lances can be coupled to a manifold for even fire control fluid distribution throughout the compost or amendment mass. The manifold is designed to direct the first control fluid flow to a portion of the lances.

15 Claims, 3 Drawing Sheets

COMPOST OR AMENDMENT FIRE CONTROL SYSTEM WITH IMPROVED FLOW CONTROL

CROSS REFERENCE TO RELATED APPLICATION

This, application is a continuation-in-part of Ser. No. 06/643,080 filed Aug. 22, 1984 now U.S. Pat. No. 4,837,153, the disclosure of which is incorporated herein by reference.

BACKGROUND OF THE INVENTION

The present invention relates to a new and improved method and apparatus for fire control in compost and amendment masses. More particularly, the invention relates to a fire blanketing gas control distribution method and system for use in compost pile reactors and amendment masses.

It has long been recognized that vast quantities of organic waste materials are being produced annually. As the world's population increases so does its capacity to produce waste materials. The disposal of these waste materials represent difficult disposal problems. Their disposal takes up valuable land, and monopolizes large amounts of time, energy, effort and capital to overcome the burden of the ever increasing quantities of organic waste material.

Composting provides an important part of the solution to reduce the problems associated with organic waste material disposal. Further, composting can provide materials that serve as important basic building block materials for such industries as the construction industry and the agriculture industry.

Composting for the most part is a time consuming, energy intensive, non uniform process. Various composting apparatus and methods are shown in U.S. Pat. Nos. 3,114,622; 3,357,812; and 4,203,755.

U.S. Pat. No. 3,114,622, issued Dec. 17, 1963 to W. Hardy, discloses an apparatus utilized as a waste material converter. The converter includes a plurality of screw augers having holes therein for the introduction of air into the waste pile. U.S. Pat. No. 3,357,812, issued Dec. 12, 1967 to J. R. Snell, discloses an apparatus for composting organic waste material utilizing a fixed pipe system located beneath the composting pile for accomplishing reversible air flow. U.S. Pat. No. 4,203,755, issued May 20, 1980 to K. Ruckstuhl, discloses an apparatus for treating waste material wherein a plurality of pipes are disposed within the composting mass for the discharge of gaseous products of decomposition.

Applicant's previous inventions provide improved composting devices, one such device that equalizes air distribution throughout the compost pile is set forth in U.S. Pat. No. 4,410,349, issued July 8, 1983 to Applicant. This equalization reduces air pressure thereby reducing horsepower, and the associated energy needed to generate the required air distribution. The air distribution equalization enhances process controls and removes or inserts moisture in the system, as desired to improve the composting efficiency. Further, the device reduces the overall length of the process air path to prevent compost pile hot spots and dead spots to provide a more uniform composting process. A second improved composting device provides improved fluid flow control for the air distribution lances utilized in compost piles as set forth in parent application Ser. No. 06/643,080, which is incorporated herein by reference.

The compost pile mixture includes a carbonaceous amendment such as sawdust or wood chips which generally is stored in a silo prior to use. The potential hazard of fire within amendment silos due to spontaneous combustion or carelessness is a very real, potential problem. In addition, if the composting reactors or piles are improperly operated and the compost product is allow to dry out excessively, the potential for fire and spontaneous combustion within the piles is very real. As a protective measure, the invention provides an effective, efficient means of injecting $CO_2$ or other fire blanketing gas or chemicals evenly throughout the amendment storage silos or the biological compost reactors to assure effective combustion control.

SUMMARY OF THE INVENTION

The present invention provides a new fire control method and apparatus for combustion control of potential fires occurring in the composting or organic waste material or amendment utilized therein. The fire control is provided by a lance which can have at least two separate fluid flow zones to provide a fire blanketing fluid flow profile into the compost or amendment. The flow zones are provided by an outer porous wall tube with a control insert tube therein, having a plurality of openings along the length thereof and spaced from the wall by gaskets to form the separate flow zones. The control insert tube can also include an internal tube valve therein, which allows for adjustment of the fire control fluid flow through the insert openings.

The fire control apparatus of the present invention preferably includes a plurality of the lances of the parent application coupled to a manifold system for the injection of the fire control fluid flow in distinct substantially uniform injection patterns substantially equally spaced from one another, where required. The manifold defines the injection and evacuation patterns in a substantially vertical plane, while the lances define the patterns in a horizontal plane.

The injection pattern of the fire control fluid flow reduces the length of the combustion preventing fluid path. This reduces the overall system pressure drop and also reduces the possibility of short circuiting which can leave hot spots or combustion spots in the compost or amendment mass and adds to the uniformity of the fire control process.

The manifold and lances can be sized and arranged in accordance with the requirements of the mass to be controlled as well as the size and shape of the compost or amendment containment structure. This adds flexibility and adaptability to the system. The lances of the apparatus are made from stainless steel or any non corrosive easily cleanable material.

DETAILED DESCRIPTION OF THE DRAWINGS

FIGS. 1-4 are a general description of a distribution system similar to that embodied in U.S. Pat. No. 4,410,349. The system can embody the lances of the parent application which are specifically illustrated in FIGS. 5 and 6 and can replace the prior lances described in U.S. Pat. No. 4,410,349.

Figure 1:
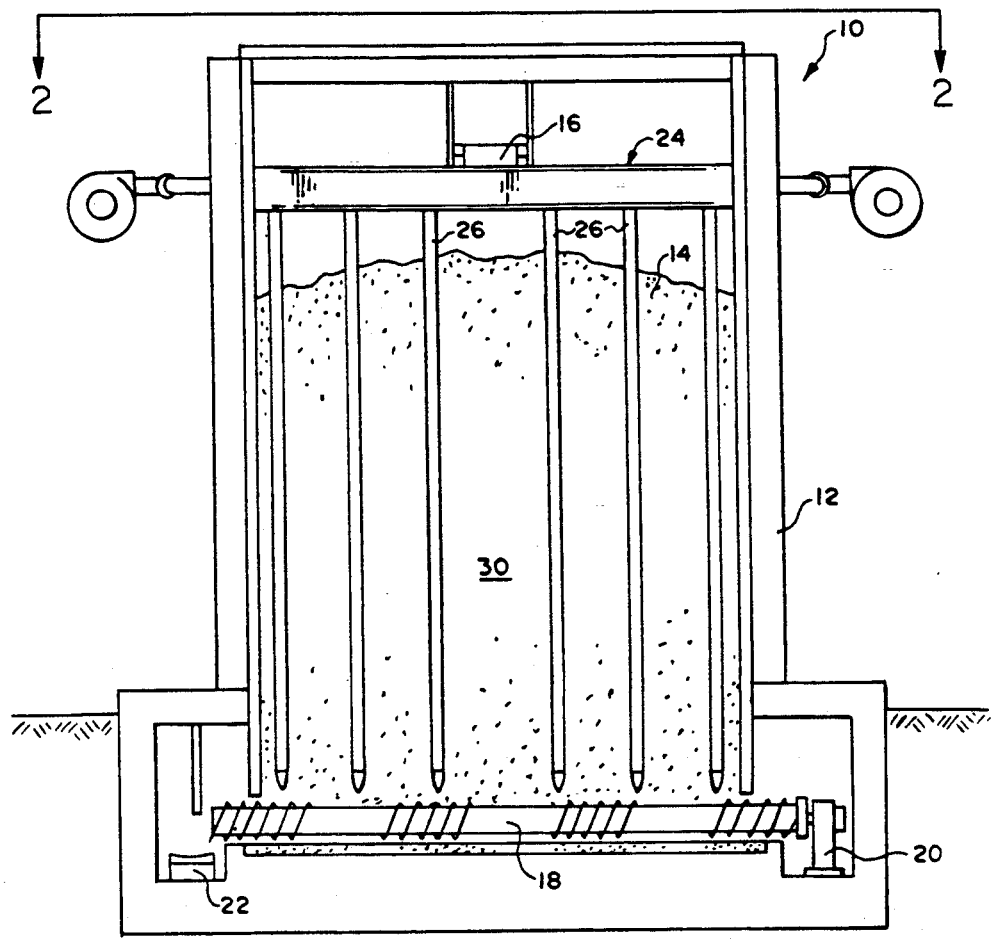
FIG. 1 is a vertical sectional view of a processing structure embodying the present fire control invention.

Referring now to FIG. 1, there is illustrated a compost air injection and evacuation system 10 which which can be utilized in the fire control system of the present invention. The system 10 includes a containment structure 12 which houses the fluid or air distribution system. As disclosed in copending application, Ser. No. 190,363, entitled "Amendment Drying Injection and Evacuation System", filed concurrently herewith and incorporated herein by reference, the system 10 structure equally can be utilized in drying carbonaceous amendment in the amendment storage silos. Also, as disclosed in copending application Ser. No. 190,340, entitled "Biofiltration Air Pollution Control System", filed concurrently herewith and incorporated herein by reference, the system structure can be utilized in filter beds in the biofiltration process. The disclosure hereinafter of the fire prevention system is equally applicable to the amendment mass. The containment structure 12 receives material 14 to be composted or dried by an infeed conveyor and distributor 16, located near the upper portion of the structure 12. Once composted or dried, the finished product is discharged near the bottom portion of the containment structure 12 by a discharge screw 18 driven by a suitable drive system 20. The finished product is discharged onto a discharge conveyor 22 adapted to carry the material to loading and handling facilities for further processing or shipping.

The containment structure 12 as depicted in FIG. 1 is basically rectangular in configuration; however the air distribution system 10 incorporates adaptability and flexibility so as to be utilized in containment structures of various sizes and shapes, such as circular structures, and A-frame structures, for example. Further, the air distribution system also can be used in open pile compost arrangements.

Figure 2:
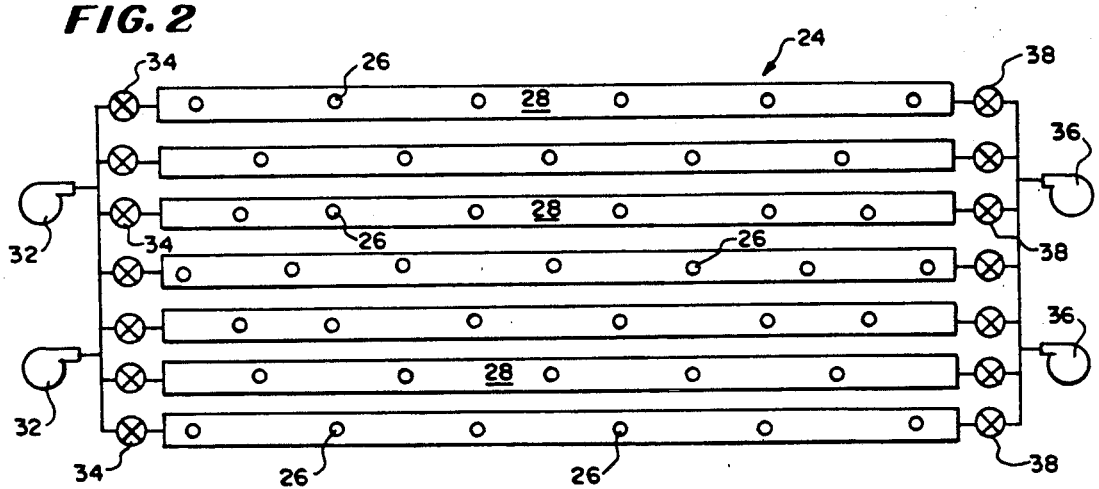
FIG. 2 is a section taken along line 2—2 of FIG. 1.

The fluid or air distribution system 10 includes a manifold 24 for directing fluid flow towards and away from a plurality of lances 26 (FIGS. 1 and 2). The manifold 24 is situated near the upper end portion of the containment structure 12 and is suspended in a substantially horizontal plane. The lances 26 are coupled to the manifold 24 at various points along the length of a plurality of box beams 28 and project downward into the material 14 in a compost or amendment pile 30.

The manifold 24 is constructed so as to deliver fluid flow to the lances 26 by one or more air handlers or blowers 32 through one or a plurality of manual or automatic valves 34. The fluid flow can be reversed to remove fluid from the lances 26 and hence the compost or amendment pile 30 by a second set of exhaust blowers 36 and valves 38. This creates a substantially uniform pattern of fluid injection into and a substantially uniform pattern of fluid evacuation from the compost or amendment pile SO through the lances 26.

The uniform patterns hereinabove discussed are designed to reduce the length of the process fluid path through the compost or amendment pile 30. This reduction in length reduces the overall system pressure drop which reduces the pressure needed to circulate the fluid. Less fluid pressure means less horsepower required which translates into a substantial energy savings.

Further, the uniform fluid patterns decrease the possibility of short circuiting which causes reactor hot spots and dead spots which create non-uniformity of processing in the compost pile. Also the uniform fluid patterns lend a greater ability to control process conditions for greater efficiency in composting or drying.

The air handlers 32 and 36 and the valves 34 and 38 are adapted to either manually or automatically, attendant to sensed process moisture condition or programmed timing sequence, reverse the fluid flow in the manifold 24. The fluid flow reversal changes the fluid flow within the compost or amendment pile 30, but still maintains substantially uniform patterns of fluid injection and fluid evacuation. This fluid flow reversal further allows greater control over the composting or drying operation to reduce the composting or drying time and obtain a more uniform end product.

As above stated, the potential hazard of fire within amendment silos due to spontaneous combustion or carelessness is a very real, potential problem. In addition, if the composting reactors or piles ar improperly operated and the compost product is allow to dry out excessively, the potential for fire and spontaneous combustion within the piles is very real. As a protective measure, the invention provides an effective, efficient means of injecting $CO_2$ or other fire blanketing gas or chemicals evenly throughout the amendment storage silo or the biological compost reactors to assure effective combustion control. The fire blanketing gas can be injected into the compost or amendment mass by closing the discharge valve 38 and turning off the exhaust blowers 36. The fire blanketing or extinguishing gas then can be injected through the valves 34, which can be threeway valves, with the blowers 32 also turned off. Alternately, the valves 38 also can be threeway valves which also can be utilized. Also, separate fire injection valves (not illustrated) can be provided for the injection of the fire control fluid. Further, a particular one or ones of the valves 34 and/or 38 or even specific ones of the lances 26 also can be utilized if it is apparent where the combustion problem is located.

Figure 3:
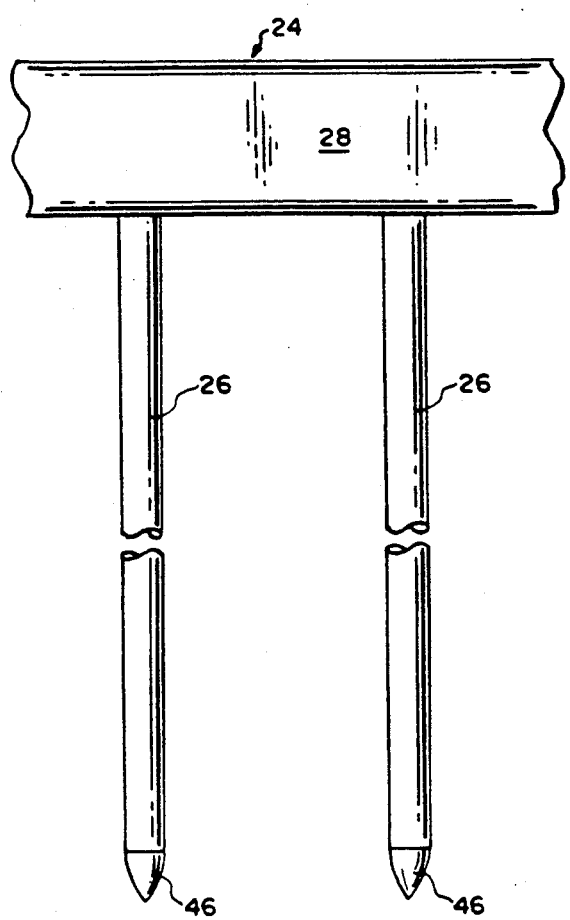
FIG. 3 is a partial fragmentary elevational view of a portion of the manifold and lances.
Figure 4:
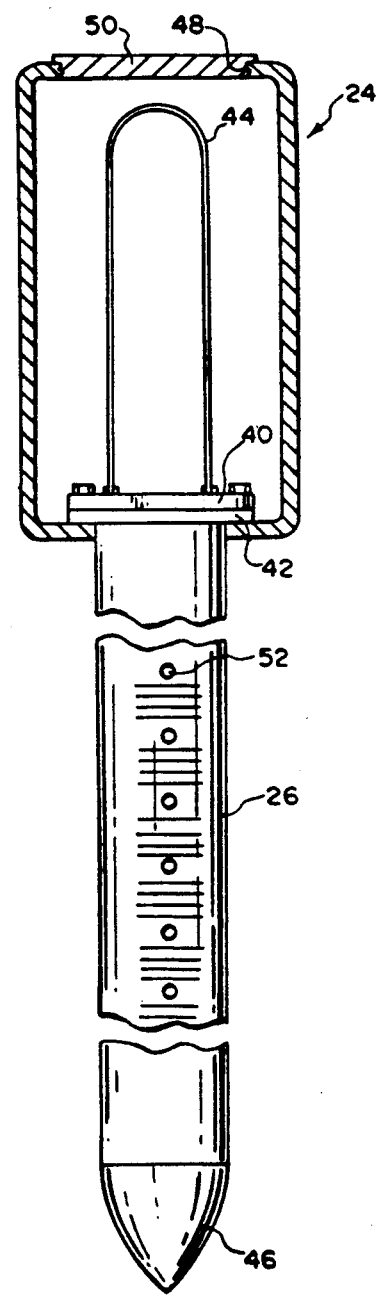
FIG. 4 is a partial fragmentary elevational view of another portion of the manifold and lances.

The manifold 24 and the lances 26 can best be seen in FIGS. 3 and 4. In FIG. 4 the lance 26 is coupled to the manifold 24 by a flange and gasket arrangement 40 and 42 or any similar quick disconnect arrangement. The lance 26 rests on the bottom o±the manifold beam 28 on the gasket 42, which preferably is chosen to be thick enough to provide some lateral movement to the lance 26 while maintaining a fluid tight seal with the beam 28. The gasket 42 allows the lances 26 which are suspended vertically within the compost or amendment pile 30 without bottom attachment, freedom of movement to allow the use of front end loaders within the containment structure 12 without damage to the lances 26 contacted or moved thereby.

The lances 26 have lifting hoops 44 connected to the flange 40 and driving points 46 connected at their lower end portions for the ease of removal/insertion of the lances into the compost or amendment pile 30. The box beams 28 include openings 48, through which the lances 26 are inserted and removed. The openings 48 include removable caps 50, which can be formed of plastic, rubber or other materials and can be threaded or snap engaged within the opening 48. This arrangement facilitates cleaning, maintenance, adjustment and replacement of the lances 26.

The lances 26 are made of an easily cleanable, non-corrosive material such as stainless steel or the like, for example. Each lance 26 includes a pattern of orifices 52 along its length for the introduction and evacuation of fluid into the compost or amendment pile 30. Fluid flow reversal provides for automatic self cleaning of the lances 26.

Lance length, lance spacing, as well as the pattern and size or orifices in the lance are dictated by the compost characteristics, and air flow requirements. Further the size and shape of the containment structure 12 dictates the size of the lances. For example, in an A-frame containment structure manifolds or beams will be placed at various levels to accommodate the sloping sides to maintain uniform patterns of fluid flow out to edges of the structure. This will also necessitate different lengths of lances which can be formed in interconnecting segments. In an open pile compost arrangement the material to be composted is in a mound form with the mound being higher at the middle portion than at its outer end portions. This type of arrangement dictates shorter lances at the outer end portions and longer lances in the middle portion.

The air distribution system provides substantially uniform patterns of fluid injection and evacuation in a compost or amendment pile. These patterns reduce the process fluid path which reduces fluid pressure, and reduces horsepower which in turn lessens energy consumption. The reversing of the fluid flow in the air distribution system provides greater controlling of the process conditions to provide a more uniform compost pile by negating the cooling effect of fluid injection in one area which tends to produce dead spots, i.e. non-composting or non-drying areas. These same advantages ensure that the fire control fluid is easily and quickly distributed to eliminate combustion.

Figure 5:
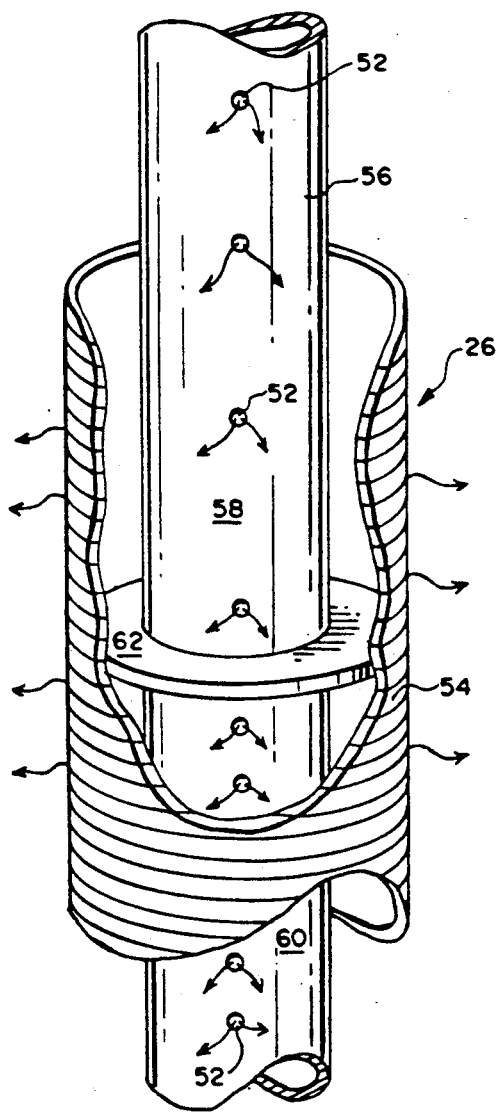
FIG. 5 is a partial fragmentary elevational view of a detailed embodiment of the lances which can be utilized in the present invention.
Figure 6:
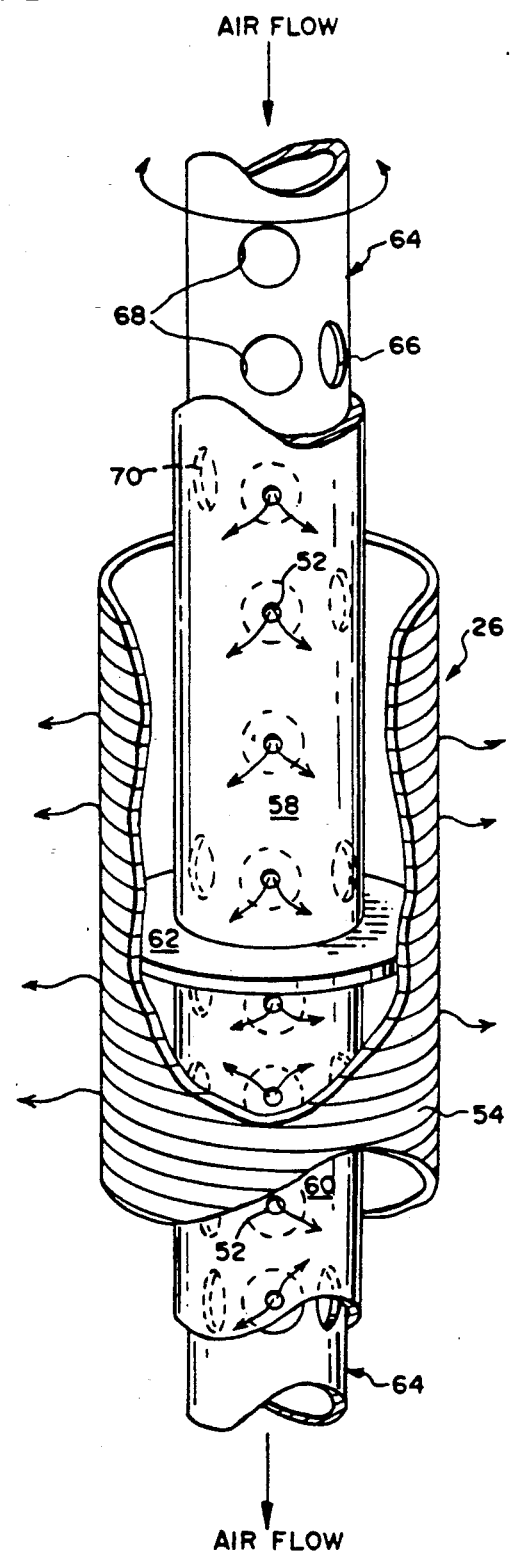
FIG. 6 is a partial fragmentary elevational view of a second embodiment of the lances which can be utilized in the present invention.

An improved and more controlled air or fluid flow profile is provided by the lances 26 embodied in the parent application, as more specifically described in FIGS. 5 and 6. Each lance 26 includes an outer air flow wall or tube 54. The tube 54 forms the body of the lance 26 and preferably can be formed from a stainless steel mesh or screen such as sold under the trade name Wedgewire. The grid size can be chosen for the particular compost application, and typically can be on the order of 0.002 inches.

The lance 26 includes a fluid flow characterizing control insert 56. The insert 56 includes the plurality of apertures or openings 52 spaced along the length thereof. The apertures 52 are typically on the order of 0.03 to 0.0625 inches in diameter, which insures that they will not be blocked by particles which can pass through the outer wall 54. The apertures 52 typically have a spacing which varies along sections of the insert 56 to provide the desired fluid flow profile into the compost.

The apertures 52 are illustrated with a first spacing along the length of an insert section 58 and a second spacing along the length of a second insert section 60. Typically, the compost pile has fresh material toward the top of the pile which requires relatively little air flow. The middle areas generally exhibit a higher degree of activity and require a greater flow for removing oxygen generated by the compost and to control the moisture content in the compost. The lower most areas can require the greatest fluid flow for moisture removal. This flow profile is necessary to insure that the reaction takes place in the most controlled and efficient manner. The amendment pile can have a different moisture profile and fluid flow requirement.

The density of the compost or amendment pile 30 increases from top to bottom due to the weight of the compost or amendment material 14, which requires different fluid pressure to equalize the fluid flow into the compost or amendment material 14. To equalize or control the fluid flow into the increased compost or amendment density, more or larger orifices 52 are formed in the lower portion of the lances 26 to accomplish the desired flow rate. As resistance to the fluid flow decreases in the upper portion of the lances 26, the number or size of the orifices 52 are reduced to equalize the flow rate by causing a higher pressure drop across the orifices 52. Therefor, the orifices 52 generally will be spaced further apart along the top of the lance and closer together along the bottom of the lance 26. The orifices 52 can also be graduated in size from smaller at the top to larger at the bottom of the lance 26.

The improved air flow control profile is provided by the outer wall 54, the insert 56, the apertures 52 along with a plurality of fluid control gaskets or dams 62 (only one of which is illustrated). The gaskets 62 are mounted on the insert 56 and spaced to provide a seal between separate fluid flow zones, such as the sections 58 and 60 which prevents internal short circuiting of the desired fluid flow profile from high to low pressure zones. The gaskets 62 preferably can be made of viton rubber. The insert 56 with the gaskets 62 can just be inserted into and removed from the tube 54 without removal of the tube 54, through the sealable opening 48 in the top of the manifold 24. The insert 56 and gaskets 62 then easily can be removed to adjust for fluid flow changes as needed.

Adjustments in fluid flow can also be effected by a valve 64 illustrated in FIG. 6. The valve 64 is formed from a tube configured to fit inside of the insert 56. The valve 64 includes a plurality of different aperture sets 66, 68 and 70 spaced around the valve 64, which again can vary in size and spacing along the length of the valve 64. The fluid flow profile and volume can be adjusted by rotating the valve 64 to the desired position without removing the insert 56.

Modification and variations of the present invention are possible in light of the above teachings. The lances 26 can be utilized in numerous compost or amendment flow systems and can be mounted in a variety of different ways. For example, it is possible to mount the manifold 24 below the compost or amendment pile 30 and have the lances 26 project upward into the compost or amendment pile 30. The insert 56 and the valve 64 preferably are formed from stainless steel or other non-corrosive easily cleanable material. It is therefore to be understood that within the scope of the appended claims, the invention may be practiced otherwise than as specifically described.

What is claimed and desired to be secured by Letters Patent of the United States is:

1. A method of controlling combustion in an amendment or compost mass, comprising:
   injecting a fire control fluid flow into the compost or amendment mass through at least one lance;
   providing said lance with an outer fire control fluid flow wall spaced from an inner air control insert; and providing a plurality of openings in said inner air control insert and means for separating portions of said insert and said outer wall to form separate fluid flow zones to provide a fire control fluid flow profile along the length of said lances into said compost or amendment mass.

2. The method as defined in claim 1 including adjusting said separating means to change said fire control fluid flow profile.

3. The method as defined in claim 1 including varying the spacing of said control insert openings along the length of said lance.

4. The method as defined in claim 1 including providing a plurality of said lances and injecting the fire control fluid flow through said plurality of lances.

5. The method as defined in claim 1 including providing valve means for controlling the fire control fluid flow through said plurality of openings.

6. An apparatus for controlling combustion in an amendment or compost mass, comprising:
at least one lance means for providing a fire control fluid flow profile in the compost or amendment mass, said lance means including an outer porous wall and means for forming at least two inner fluid flow control zones to form said fire control fluid flow profile; and
said means for forming said zones include a single inner fluid control insert having a plurality of openings along the length thereof spaced from said outer porous wall with at least one laterally adjustable gasket sealingly engaged on said insert between said insert and said wall to form said zones.

7. The apparatus as defined in claim 6 wherein said insert openings have at least two different spacings along the length of said insert.

8. The apparatus as defined in claim 7 including a plurality of gaskets adjustably mounted on said insert to form a plurality of variable zones.

9. The apparatus as defined in claim 6 including internal valve means for adjusting the fire control fluid flow through said insert openings.

10. The apparatus as defined in claim 9 wherein said outer wall is formed from a mesh tube, said control insert is formed from a stainless steel tube spaced from said wall by said gaskets and said valve means is formed from a stainless steel tube formed to fit inside said control insert.

11. In an apparatus for controlling combustion in an amendment or compost mass, including means adapted to inject a fire control fluid flow into the compost or amendment mass, said injection means including a plurality of lances having at least one fluid flow passageway in each lance, manifold means coupled to the fluid flow passageways in said lances for directing fluid flow towards said lances, the improvement comprising:
at least one lance means for providing a fire control fluid flow profile in the compost or amendment mass, said lance means including an outer porous wall and means for forming at least two inner fluid flow control zones to form said fire control fluid flow profile; and
said means for forming said zones include a single inner fluid control insert having a plurality of openings along the length thereof spaced from said outer porous wall with at least one laterally adjustable gasket sealingly engaged on said insert between said insert and said wall to form said zones.

12. The apparatus as defined in claim 11 including internal valve means for adjusting the fire control fluid flow through said insert openings.

13. The apparatus as defined in claim 12 wherein said outer wall is formed from a mesh tube, said control insert is formed from a stainless steel tube spaced from said wall by said gaskets and said valve means is formed from a stainless steel tube formed to fit inside said control insert.

14. The apparatus as defined in claim 11 wherein said insert openings have at least two different spacings along the length of said insert.

15. The apparatus as defined in claim 14 including a plurality of gaskets adjustably mounted on said insert to form a plurality of variable zones.

* * * * *